United States Patent [19]
Kabasawa

[11] Patent Number: 6,122,142
[45] Date of Patent: Sep. 19, 2000

[54] DISK DRIVE HAVING AN IMPROVED ERRONEOUS DISK CARTRIDGE INSERTION PREVENTING DEVICE, AND A DISK CARTRIDGE FOR USE WITH THE DISK DRIVE

[75] Inventor: Hidetoshi Kabasawa, Saitama-Ken, Japan

[73] Assignee: TEAC Corporation, Tokyo, Japan

[21] Appl. No.: 09/158,611

[22] Filed: Sep. 22, 1998

[30] Foreign Application Priority Data

Sep. 22, 1997 [JP] Japan .................................. 9-257099

[51] Int. Cl.[7] ........................... G11B 17/04; G11B 23/03
[52] U.S. Cl. ........................ 360/99.06; 360/133; 369/291
[58] Field of Search ........................ 369/291; 360/99.12, 360/99.02, 99.06, 132, 133

[56] References Cited

U.S. PATENT DOCUMENTS

| | | | |
|---|---|---|---|
| 5,163,037 | 11/1992 | Ohmori et al. | 369/77.2 |
| 5,297,133 | 3/1994 | Otsuka et al. | 369/291 |
| 5,694,278 | 12/1997 | Sumner | 360/133 |
| 5,895,659 | 4/1999 | Goto | 369/77.2 |
| 5,901,134 | 5/1999 | Funawatari | 369/291 |

FOREIGN PATENT DOCUMENTS

| | | |
|---|---|---|
| 3-216853 | 9/1991 | Japan . |
| 4-157662 | 5/1992 | Japan . |
| 4-295661 | 10/1992 | Japan . |
| 6-84538 | 12/1994 | Japan . |
| 7-334965 | 12/1995 | Japan . |
| 8-241582 | 9/1996 | Japan . |
| 8-249798 | 9/1996 | Japan . |
| 97/22970 | 6/1997 | WIPO . |

*Primary Examiner*—William Klimowicz
*Attorney, Agent, or Firm*—Anderson, Kill & Olick P.C.

[57] ABSTRACT

A disk drive includes a holder which holds one of a first disk cartridge containing an increased-capacity disk and a second disk cartridge containing an existing disk. A slanted wall is provided at one of corners of a rear edge of the holder confronting one of the first disk cartridge and the second disk cartridge when inserted into the holder. The slanted wall is configured to match both a cut-out portion of the first disk cartridge and a cut-off portion of the second disk cartridge. A mounting surface is provided adjacent to the slanted wall at one of the corners of the rear edge of the holder, the mounting surface configured to match only the projecting portion of the first disk cartridge. Further, a disk cartridge adapted for use with the disk drive is disclosed.

5 Claims, 10 Drawing Sheets

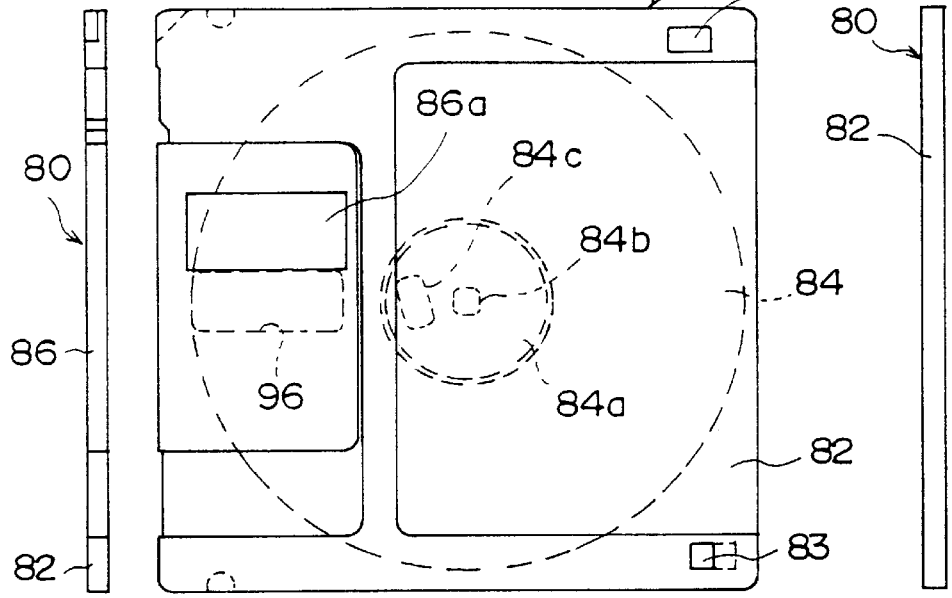
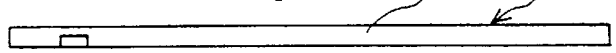
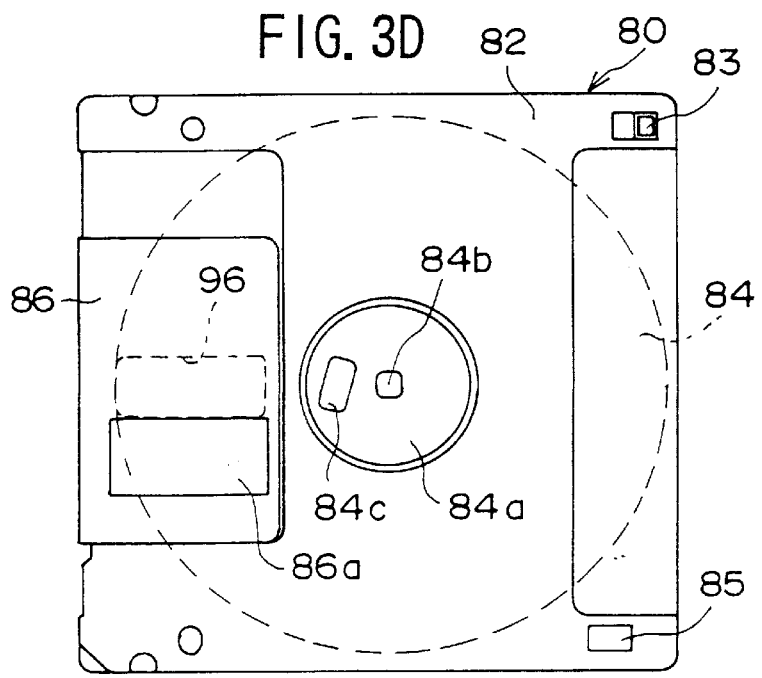

DISK DRIVE HAVING AN IMPROVED ERRONEOUS DISK CARTRIDGE INSERTION PREVENTING DEVICE, AND A DISK CARTRIDGE FOR USE WITH THE DISK DRIVE

BACKGROUND OF THE INVENTION (1) Field of the Invention

The present invention generally relates to a disk drive and a disk cartridge, and more particular to a disk drive including an erroneous insertion preventing device which prevents erroneous insertion of a disk cartridge, and a disk cartridge for use with the disk drive.

(2) Description of the Related Art

Magnetic disk drives are widely used as storage devices of computers. Some magnetic disk drives are a built-in type, and others are externally installed in the computer. A floppy disk drive is a type of the magnetic disk drive. The floppy disk drive is inexpensive, and a floppy disk for use with the floppy disk drive is small in size and light-weight. For this reason, the floppy disk drive has been frequently used as the storage device of the computer.

FIG. 11 shows an existing disk cartridge 10 which contains a normal-capacity disk. The disk cartridge 10 is, for example, a floppy disk cartridge containing a floppy disk having a storage capacity of 1.44 megabytes.

As shown in FIG. 11, the disk cartridge 10 contains a disk 14 accommodated in a hard case 12. The disk 14 is a recording medium for recording information. The case 12 is made of a resin and molded into a generally rectangular form. The cartridge 10 has a predetermined insertion direction, indicated by the arrow "X1" in FIG. 11, in which the cartridge 10 is inserted into a disk drive (not shown).

The cartridge 10 includes a cut-off portion 38 provided at a given one of corners of the case 12 on its front edge confronting the disk drive when the cartridge 10 is inserted in the insertion direction X1. The cut-off portion 38 includes a slanted surface which extends at an angle with the insertion direction X1. The cartridge 10 includes corners 40a, 40b and 40c of the case 12 other than the cut-off portion 38. Each of the corners 40a through 40c is generally right-angled.

The case 12 includes an opening at a position where the disk 14 contained in the case 12 is overlaid, and a shutter 16 is provided to close the opening in a non-loaded condition in which the cartridge 10 is not inserted into the disk drive.

Further, the cartridge 10 includes, as shown in FIG. 11, a write protection hole 13 and a disk type identification hole 15 which are provided in the case 12 adjacent to the corner 40b and the corner 40c, respectively.

FIG. 13 shows a conventional disk drive which is configured to access the disk of the cartridge shown in FIG. 11.

When the cartridge 10 in the correct position is inserted into a conventional disk drive 20 shown in FIG. 13, the shutter 16 is connected to a latch lever 28 of the conventional disk drive 20 so that the shutter 16 is transversely moved by the latch lever 28 to open the opening of the case 12. A read/write head of the conventional disk drive 20 is brought into contact with the disk 14 through the opening of the case 12, so as to read information from or write information to the disk 14.

However, if the cartridge 10 in a wrong position can be inserted into the conventional disk drive 20, the shutter 16 is not properly connected to the latch lever 28, which does not allow the movement of the shutter 16 to open the opening of the case 12. Further, the read/write head of the conventional disk drive 20 may be hit by the inserted cartridge 10, which will damage the read/write head.

Accordingly, in order to eliminate the above-mentioned problem, the insertion position in which a disk cartridge is inserted into a disk drive are predetermined with respect to the insertion direction of the disk cartridge. With respect to the disk cartridge 10, it is necessary to allow the insertion of the cartridge 10 into the conventional disk drive 20 only when the cartridge 10 in the correct position, as shown in FIG. 11, is placed into the conventional disk drive 20 in the insertion direction X1. To achieve this, the conventional disk drive 20 is provided with an erroneous insertion preventing device 42 which serves to prevent erroneous insertion of a disk cartridge into the conventional disk drive 20.

As shown in FIG. 13, the conventional disk drive 20 includes a frame 22 in which various elements of the conventional disk drive 20 are accommodated. The conventional disk drive 20 is provided with a disk loading device 30. The disk loading device 30 includes a slider 24 movably supported on the frame 22, a holder 26 provided within the slider 24, and a latch lever 28. A head carriage 32 which carries a read/write head in a radial direction of the disk is provided on a top surface of the frame 22, and the head carriage 32 is moved by a stepping motor 33. A turntable 34 on which the disk 14 is mounted and rotated is provided in the frame 22. A disk rotating motor which rotates the turntable 34 is provided on a back surface of the frame 22.

The holder 26 is formed from a sheet metal by press forming. The holder 26 includes an internal space for accommodating the disk cartridge 10 when inserted in the conventional disk drive 20. The holder 26 has side walls on which transversely extending pins 36a, 36b, 36c and 36d are provided. The slider 24 has side walls in which slanted grooves (not shown) are formed. The pins 36a through 36d of the holder 26 are connected to the slanted grooves of the slider 24 to guide and support the movement of the slider 24.

The latch lever 28 is rotatably supported on a shaft 44, and the shaft 44 is embedded on the frame 22. A helical torsion spring 46 is fixed to the shaft 44 and connected to the latch lever 28. The spring 46 exerts an actuating force on the latch lever 28 so as to rotate the lever 28 around the shaft 44 in a direction indicated by the arrow "A" in FIG. 13.

As described above, when the cartridge 10 in the correct position is inserted into the holder 26 of the conventional disk drive 20, the shutter 16 is connected to the latch lever 28 so that the shutter 16 is transversely moved by the latch lever 28 to open the opening of the case 12. Further, when the cartridge 10 is moved to a given disk loading point within the holder 26, the connection of the latch lever 28 and the slider 24 is canceled. A spring (not shown) is connected to the slider 24 and exerts an actuating force on the slider 24 so as to push the slider 24 in an ejection direction indicated by the arrow "X2" in FIG. 13.

The latch lever 28 is provided with an internally formed hook 48, and the hook 48 is connected to the slider 24. When the cartridge 10 is ejected out of the conventional disk drive 20, the hook 48 is connected to the slider 24 so as to restrict the movement of the slider 24.

When the latch lever 28 is rotated by the inserted cartridge 10, the hook 48 is separated from the slider 24 so that the slider 24 is moved in the ejection direction X2 by the actuating force of the spring. The holder 26 in which the cartridge 10 is held is lowered by the movement of the slider 24. This makes the cartridge 10 be mounted on the turntable 34. The read/write head held on the head carriage 32 is brought into contact with the disk 14 through the opening of the case 12.

In the conventional disk drive 20 of FIG. 13, the erroneous insertion preventing device 42 is provided on the holder 26. The erroneous insertion preventing device 42 serves to prevent erroneous insertion of a disk cartridge into the holder 26 of the conventional disk drive 20.

As shown in FIG. 13, the erroneous insertion preventing device 42 includes a helical torsion spring 50 and a groove 52 formed in the holder 26. The spring 50 has a coil portion 50a in the middle of the spring 50, an arm portion 50b at one end, and an extended arm portion 50c at the other end. A rib 54 is integrally formed with the holder 26, and the coil portion 50a is fixed to the rib 54. A rib 56 is integrally formed with the holder 26, and the arm portion 50b is connected to the rib 56. The extended arm portion 50c is passed through the groove 52 and projects toward the internal space of the holder 26.

The helical torsion spring 50 is attached to the holder 26 in the above-described manner. The extended arm portion 50c of the spring 50 is movable within the groove 52 in one of directions indicated by the arrows "B1" and "B2" in FIG. 13. When the cartridge 10 is not inserted into the holder 26, the extended arm portion 50c is actuated in the direction B1due to an actuating force of the spring 50 and pressed against the end of the groove 52. The spring 50 is arranged on the holder 26 such that the leading edge of the extended arm portion 50c confronts the cut-off portion 38 of the cartridge 10 when the cartridge 10 in the correct position is inserted into the holder 26 in the insertion direction X1.

FIG. 14A through FIG. 14C are diagrams for explaining a function of the erroneous insertion preventing device of the conventional disk drive shown in FIG. 13.

As shown in FIG. 14A, when the cartridge 10 in the correct position is inserted into the holder 26, the cut-off portion 38 of the cartridge 10 confronts the leading edge of the extended arm portion 50c. The cut-off portion 38 includes the slanted surface extending at an angle with the insertion direction X1. The extended arm portion 50c is actuated in the direction B2 by the cut-off portion 38 of the inserted cartridge 10.

Hence, as shown in FIG. 14B, the insertion of the cartridge 10 into the holder 26 is allowed when the cartridge 10 in the correct position is inserted.

However, as shown in FIG. 14C, when the cartridge 10 in a wrong position is inserted into the holder 26, the corner (for example, the corner 40a) of the cartridge 10, other than the cut-off portion 38, confronts the leading edge of the extended arm portion 50c. The extended arm portion 50c is not actuated in the direction B2 but pressed against the end of the groove 52 in the direction B1. The insertion of the cartridge 10 in the wrong position is stopped by the extended arm portion 50c. Hence, the insertion of the cartridge 10 in the wrong position into the holder 26 is prevented by the erroneous insertion preventing device 42.

With recent developments of high-speed computers and demands for increases of the amount of data processed by the computers, a disk drive which is configured to access an increased-capacity disk has been proposed. In order to ensure the compatibility of the increased-capacity disk drive with the normal-capacity disk, it is desirable to provide a disk drive which is capable of accessing each of the normal-capacity disk and the increased-capacity disk, as well as a disk cartridge containing the increased-capacity disk for use with the disk drive.

FIG. 12 shows a conceived disk cartridge containing an increased-capacity disk. The disk cartridge shown in FIG. 12 is conceived from the disk cartridge 10 so as to allow for use with a disk drive configured to access an increased-capacity disk.

Hereinafter, a disk cartridge containing an increased-capacity disk will be called the first disk cartridge. A disk drive configured to access the increased-capacity disk will be called the first disk drive. The disk cartridge 10 containing the normal-capacity disk will be called the second disk cartridge. The conventional disk drive 20 configured to access the normal-capacity disk will be called the second disk drive.

As shown in FIG. 12, the disk cartridge 60, which is the first disk cartridge, has a configuration which is essentially the same as that of the disk cartridge 10 which is the second disk cartridge. The cartridge 60 contains an increased-capacity disk 64 accommodated in a hard case 62. The disk 64 is, for example, an increased-capacity disk having a storage capacity of 200 megabytes. The case 62 is made of a resin and molded into a generally rectangular form. The cartridge 60 has a predetermined insertion direction, indicated by the arrow "X1" in FIG. 12, in which the cartridge 60 is inserted into a disk drive (not shown).

The cartridge 60 includes a cut-off portion 68 provided at a given one of corners of the case 62 on its front edge confronting the disk drive when the cartridge 60 is inserted in the insertion direction X1. The cut-off portion 68 includes a slanted surface extending at an angle with the insertion direction X1. The cartridge 60 includes corners 70a, 70b and 70c of the case 62 other than the cut-off portion 68. Each of the corners 70a through 70c is generally right-angled.

The case 62 includes an opening at a position where the disk 64 contained in the case 62 confronts, and a shutter 66 is provided to close the opening in a non-loaded condition in which the cartridge 60 is not inserted into the disk drive.

Further, the cartridge 60 includes, as shown in FIG. 12, a write protection hole 63 and a disk type identification hole 65 which are provided in the case 62 adjacent to the corner 70b and the corner 70b, respectively. The disk type identification hole 65 of the cartridge 60 is larger than the disk type identification hole 15 of the cartridge 10. Only the disk type identification hole 65 is different from the disk type identification hole 15, in order to allow a disk drive to identify the type of the disk cartridge inserted into the disk drive.

As described above, the first disk cartridge and the second disk cartridge are different from each other only in the size of the disk type identification hole. However, the capacity of the disk 64 of the first disk cartridge 60 is much larger than the capacity of the disk 14 of the second disk cartridge 10. Suppose a first disk drive which is configured to access each of the increased-capacity disk and the normal-capacity disk. If the first disk drive is provided with a detecting device which detects the type of the inserted disk cartridge by sensing the size of the disk type identification hole, it is possible for the first disk drive to detect which of the first disk cartridge and the second disk cartridge is inserted into the first disk drive.

Hence, it is conceivable to provide the above-mentioned first disk drive with an erroneous insertion preventing device which is the same as the error insertion preventing device 42 of the second disk drive 20. Similar to the second disk drive 20, the conceived first disk drive prevents the insertion of the first disk cartridge 10 or the second disk cartridge 60 in a wrong position into the holder by means of the erroneous insertion preventing device.

However, if the first disk cartridge 60 shown in FIG. 12 is used with the second disk drive 20 shown in FIG. 13, the extended arm portion 50c of the second disk drive 20 allows the insertion of the first disk cartridge 60 into the holder 26 when the first disk cartridge 60 in the correct position is inserted into the second disk drive 20. The read/write head of the second disk drive 20 uses a configuration and a head-contact pressure which are different from those used by the read/write head of the first disk drive. When the disk 64 of the first disk cartridge 60 is accessed by the second disk drive 20, the recording surface (or a magnetic layer) of the disk 64 may be significantly damaged by the read/write head of the second disk drive 20. The information stored in the disk 64 may be lost or an additional access to the disk 64 may be impossible.

SUMMARY OF THE INVENTION

An object of the present invention is to provide an improved disk cartridge and disk drive in which the above-described problems are eliminated.

Another object of the present invention is to provide a disk drive which is capable of accessing each of the normal-capacity disk and the increased-capacity disk and has an erroneous insertion preventing device effectively preventing the insertion of either the first disk cartridge or the second disk cartridge in a wrong position into the disk drive.

Still another object of the present invention is to provide a disk cartridge which contains an increased-capacity disk and is configured to effectively prevent erroneous insertion of the disk cartridge into the normal-capacity disk drive.

The above-mentioned objects of the present invention are achieved by a disk drive in which one of a first disk cartridge having an increased-capacity disk contained in a first case and a second disk cartridge having an existing disk contained in a second case is inserted so as to access the disk of the inserted cartridge by a read/write head, the first case having a cut-out portion and a projecting portion provided in an overlaid manner at one of corners of a front edge of the first case confronting the disk drive when the first disk cartridge is inserted, the second case having a cut-off portion provided at one of corners of a front edge of the second case confronting the disk drive when the second disk cartridge is inserted, the disk drive comprising: a holder which holds one of the first disk cartridge and the second disk cartridge; a slanted wall which is provided at one of corners of a rear edge of the holder confronting one of the first disk cartridge and the second disk cartridge when inserted into the holder, the slanted wall configured to match both the cut-out portion of the first disk cartridge and the cut-off portion of the second disk cartridge; and a mounting surface which is provided adjacent to the slanted wall at one of the corners of the rear edge of the holder, the mounting surface configured to match only the projecting portion of the first disk cartridge.

The above-mentioned objects of the present invention are achieved by a disk cartridge for use with a disk drive configured to access each of an increased-capacity disk and an existing disk, the disk cartridge comprising: a case which accommodates the increased-capacity disk, the case having a front edge confronting the disk drive when the disk cartridge is inserted into the disk drive in an insertion direction; a cut-out portion which is provided at one of corners of the front edge of the case, the cut-out portion having a slanted surface extending at an angle with the insertion direction so as to match a slanted wall of the disk drive; and a projecting portion which is provided in an overlaid manner with the cut-out portion at one of the corners of the front edge of the case, the projecting portion configured to prevent erroneous insertion of the disk cartridge into an existing disk drive which is configured to access only the existing disk.

The disk drive according to the present invention is capable of accessing each of the existing disk and the increased-capacity disk when the related disk cartridge in the correct position is inserted into the disk drive. In the disk drive according to the present invention, the slanted wall and the mounting surface form an improved erroneous insertion preventing device which is effective in preventing the erroneous insertion of either the first disk cartridge or the second disk cartridge in a wrong position into the disk drive. This makes it possible to safely avoid damaging a recording surface of either the increased-capacity disk or the existing disk by the read/write head of the disk drive.

Further, the disk cartridge according to the present invention is effective in preventing erroneous insertion of the disk cartridge into the normal-capacity disk drive. This makes it possible to safely avoid damaging the recording surface of the increased-capacity disk of the disk cartridge by a read/write head of the normal-capacity disk drive.

BRIEF DESCRIPTION OF THE DRAWINGS

The above and other objects, features and advantages of the present invention will be more apparent from the following detailed description when read in conjunction with the accompanying drawings in which:

FIG. 3A through FIG. 3F are views of the disk cartridge of the present invention;

DETAILED DESCRIPTION OF THE PREFERRED EMBODIMENTS

A description will now be given of the preferred embodiments of the present invention with reference to the accompanying drawings.

FIG. 1, FIG. 2 and FIG. 3A through FIG. 3F show one embodiment of a disk cartridge of the present invention which contains an increased-capacity disk.

Figure 1:
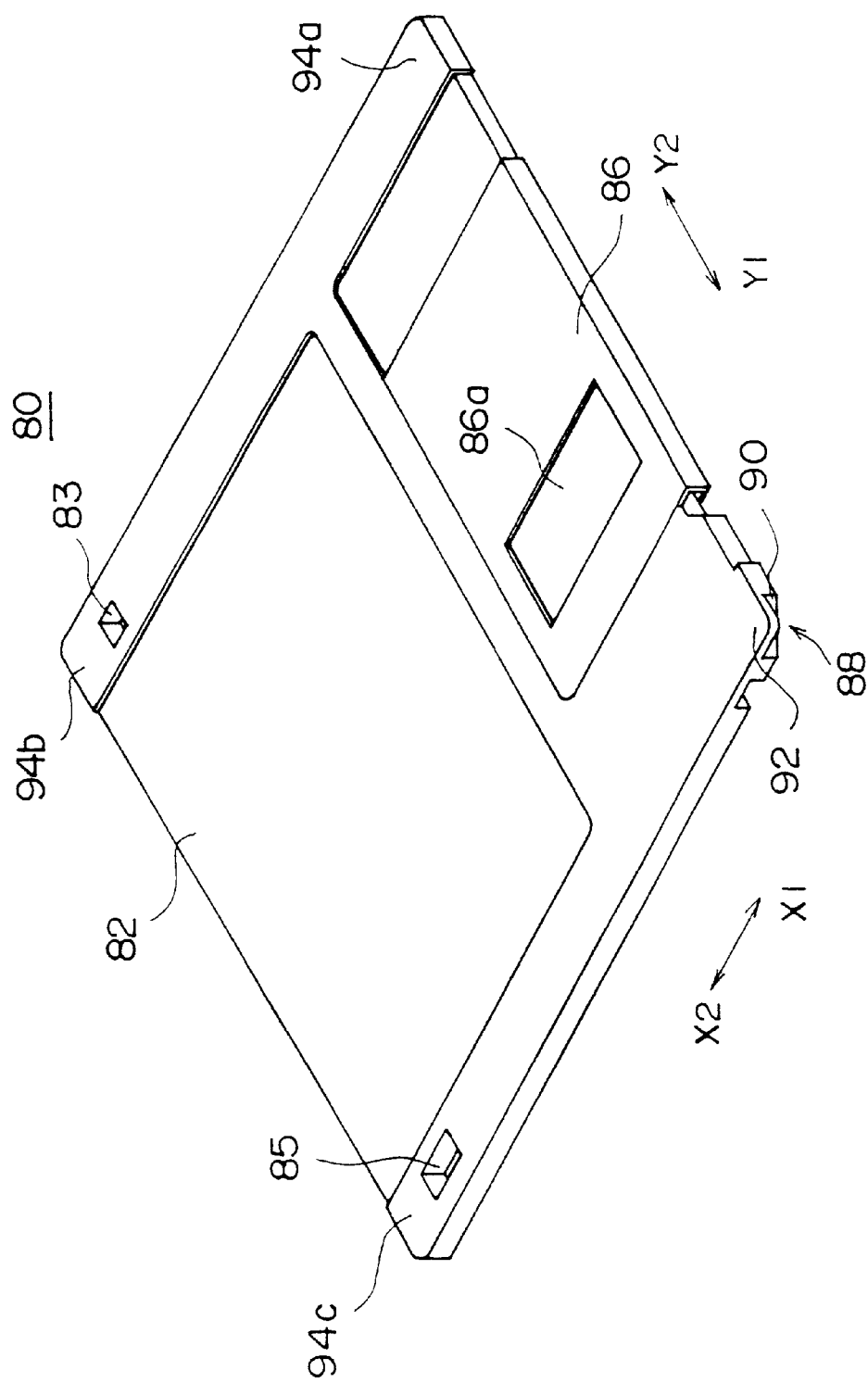
FIG. 1 is a perspective view of one embodiment of a disk cartridge of the present invention.
Figure 2:
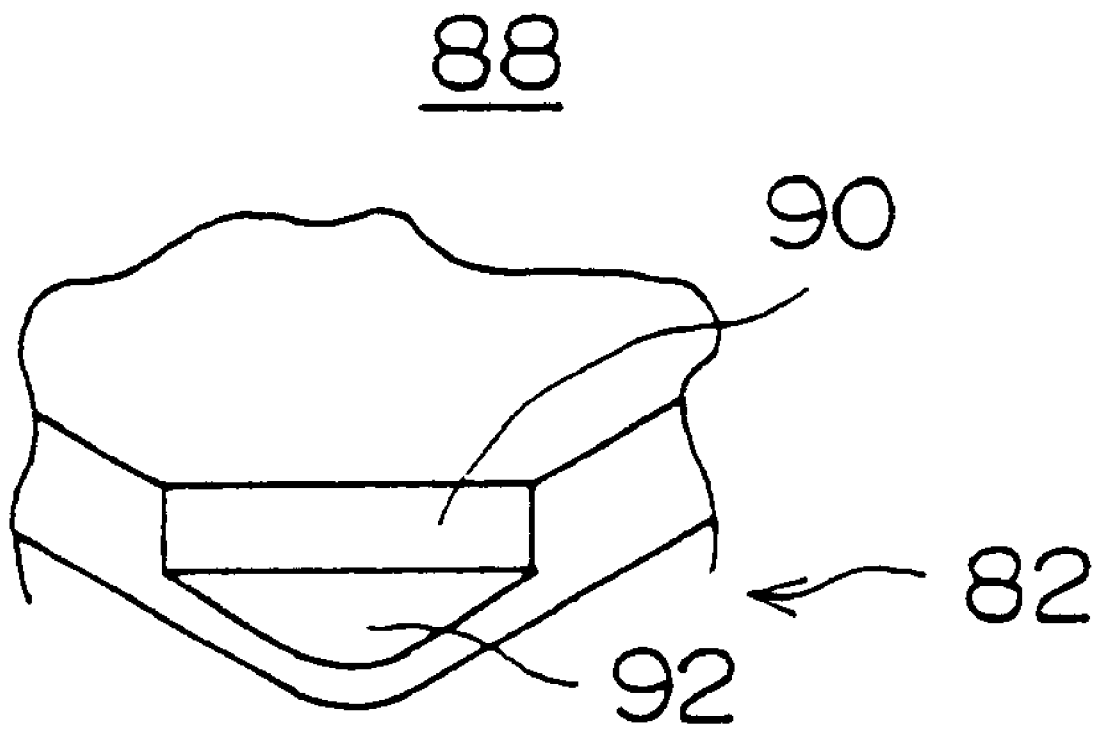
FIG. 2 is an enlarged view of an essential part of the disk cartridge of the present invention.

FIG. 1 is a perspective view of a disk cartridge 80 according to the present invention. FIG. 2 is an enlarged view of an essential part of the disk cartridge 80. FIG. 3A, FIG. 3B, FIG. 3C, FIG. 3D, FIG. 3E, and FIG. 3F are left side, top, right side, bottom, front, and rear views of the disk cartridge 80, respectively.

As shown in these drawings, the disk cartridge 80 contains an increased-capacity disk 84 accommodated in a hard case 82. The disk 84 is a recording medium for recording information. The case 82 is made of a resin and molded into a generally rectangular form. The cartridge 80 has a predetermined insertion direction, indicated by the arrow "X1" in FIG. 1, in which the cartridge 80 is inserted into a disk drive (not shown).

In the present embodiment, the increased-capacity disk 84 is, for example, a magnetic disk having a storage capacity of 200 megabytes. As indicated by dotted lines in FIG. 3B, the disk 84 has a metal hub 84*a* in the middle of the disk 84, and the metal hub 84*a* is provided with a spindle hole 84*b* and a positioning hole 84*c*. A spindle shaft of a disk drive is inserted into the spindle hole 84*b*. The positioning hole 84*c* is used to properly position the disk cartridge 80 within the disk drive.

In a case of the increased-capacity disk 84, even if the surface of the disk 84 is slightly flawed, information recorded in the disk 84 is significantly influenced by the flaw. Hence, a careful attention must be taken to avoid flawing the surface of the disk 84 when handling the disk 84 with the disk drive.

The disk cartridge 80 is inserted and loaded into a disk drive 100 (which will be described later), and the disk drive 100 accesses the increased-capacity disk 84 of the disk cartridge 80 to read information from the disk 84 or write information to the disk 84. Further, the disk drive 100 is configured to be capable of reading information from and writing information to the normal-capacity disk 14 of the disk cartridge 10 when inserted and loaded into the disk drive 100.

Hereinafter, for the sake of convenience, the disk cartridge 80 containing an increased-capacity disk will be called the first disk cartridge. The disk drive 100 configured to access the increased-capacity disk will be called the first disk drive. The disk cartridge 10 containing the normal-capacity disk will be called the second disk cartridge. The conventional disk drive 20 configured to access the normal-capacity disk will be called the second disk drive.

As shown in FIG. 1 through FIG. 3F, the disk cartridge 80 includes a stepped erroneous-insertion preventing part 88 provided at a given one of corners of the case 82 on its front edge confronting the disk drive when the cartridge 80 is inserted in the insertion direction X1. The erroneous-insertion preventing part 88 has a cut-out portion 90 and a projecting portion 92.

As shown in FIG. 2, in the stepped erroneous-insertion preventing part 88 of the cartridge 80, the cut-out portion 90 and the projecting portion 92 are provided in an overlaid manner in the direction of the thickness of the cartridge 80. The part 88 having this configuration may easily be formed integrally with the case 82 through a molding process of a resin.

Figure 11:
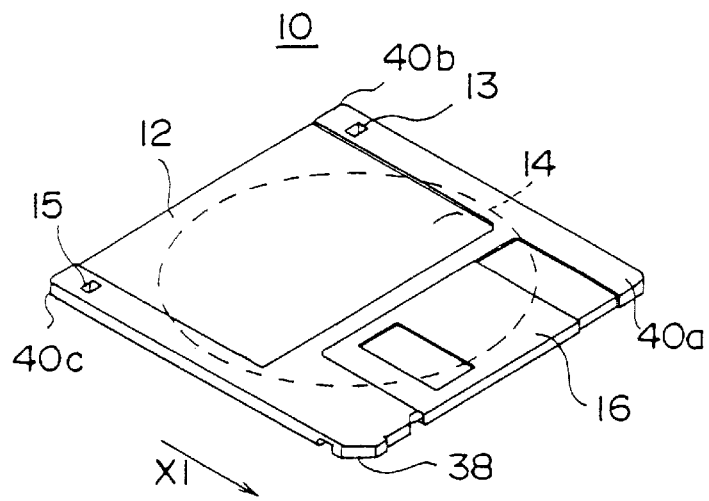
FIG. 11 is a perspective view of an existing disk cartridge containing a normal-capacity disk.
Figure 12:
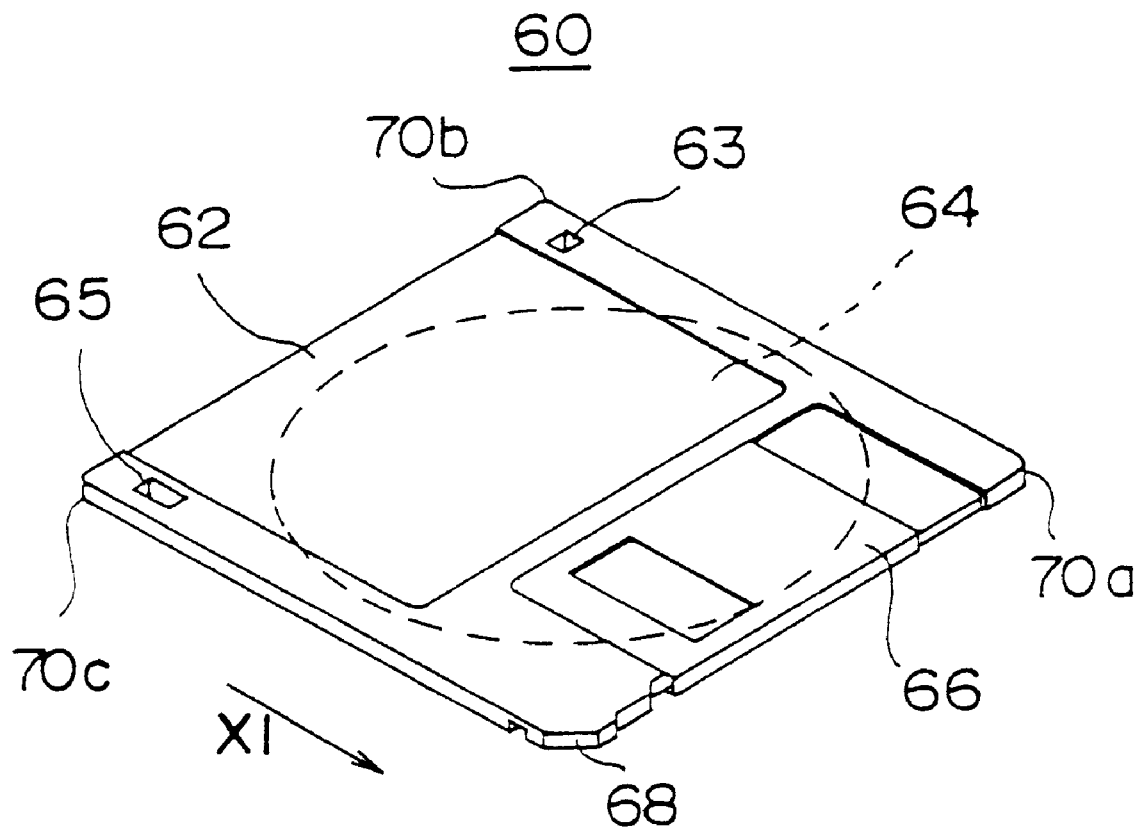
FIG. 12 is a perspective view of a conceived disk cartridge containing an increased-capacity disk.
Figure 13:
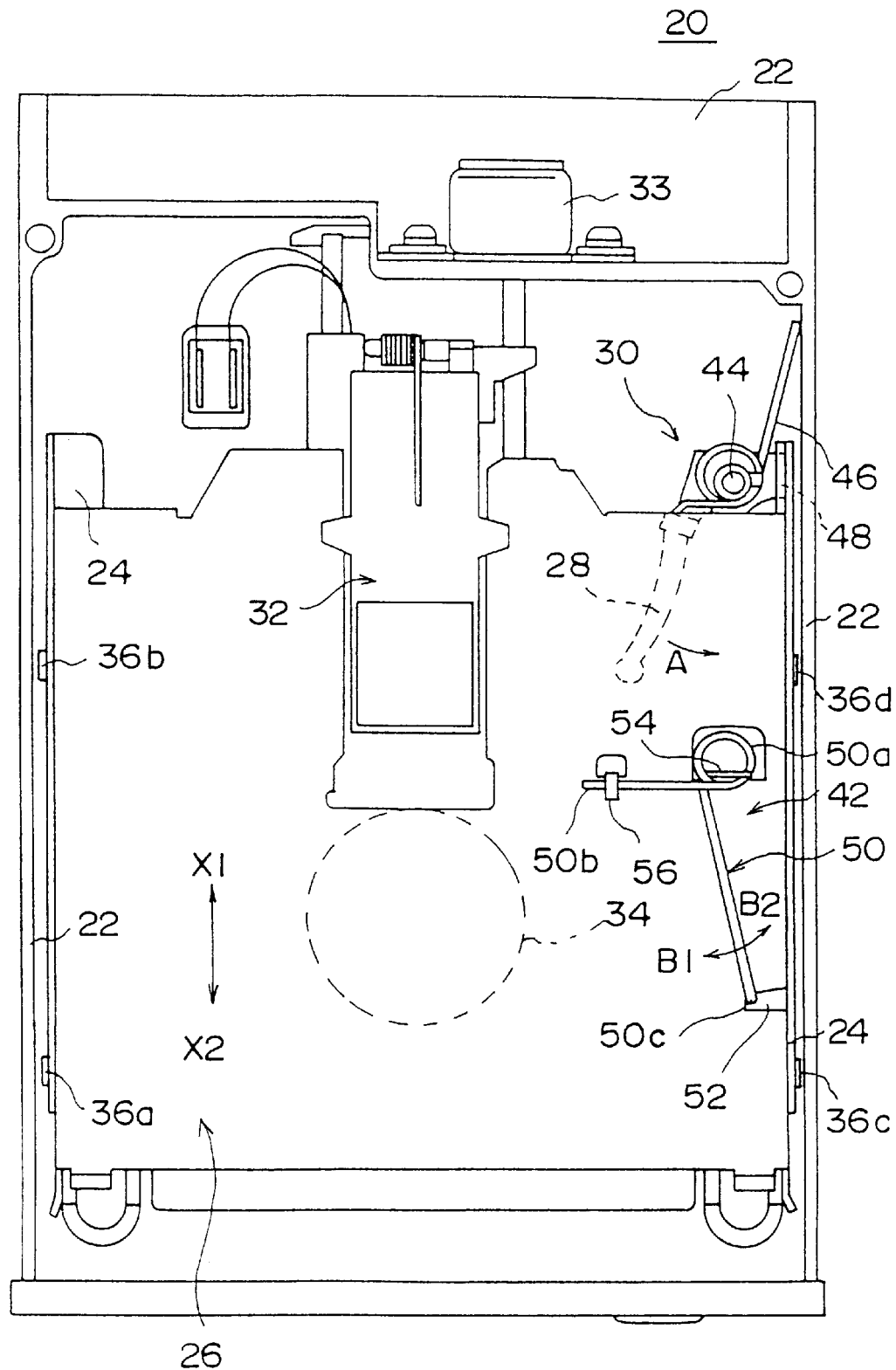
FIG. 13 is a top view of a conventional disk drive which is configured to access the normal-capacity disk of the cartridge shown in FIG. 11.

The cut-out portion 90 includes a slanted surface which extends at an angle with the insertion direction X1. The angle of the slanted surface of the portion 90 is the same as the angle of the slanted surface of the cut-off portion 38 of the cartridge 10 of FIG. 11. The projecting portion 92 includes a stepped surface extending from the slanted surface of the cut-out portion 90 and forming a generally right-angled corner of the case 82. The cartridge 80 includes corners 94*a*, 94*b* and 94*c* of the case 82 other than the part 88. Each of the corners 94*a* through 94*c* has a generally right-angled edge of the case 82.

As shown in FIG. 1 and FIG. 3B, when the disk cartridge 80 is viewed from its top, the case 82 having the right-angled edges at the four corners is seen and the projecting portion 92 of the part 88 serves to form one of the corners of the case 82. As shown in FIG. 1 and FIG. 3D, when the disk cartridge 80 is viewed from its bottom, the case 82 having the right-angled edges at the four corners is seen but the cut-off portion 90 of the part 88 serves to form the recessed surface.

As shown in FIG. 3B, the case 82 includes an opening 96 at a position where the disk 84 contained in the case 82 is overlaid, and a shutter 86 is provided to close the opening 96 when the cartridge 80 is not inserted into the disk drive. The shutter 86 includes an opening 86*a*. When the cartridge 80 in the correct position is inserted into the disk drive, the shutter 86 is transversely moved by the disk drive to open the opening 96 of the case 82. The opening 86*a* of the shutter 86 at this time matches the opening 96. A read/write head of the disk drive is brought into contact with the disk 84 through the opening 96 of the case 82, so as to read information from or write information to the disk 14.

Further, the cartridge 80 includes, as shown in FIG. 1, a write protection hole 83 and a disk type identification hole 85 which are provided in the case 82 adjacent to the corner 94*b* and the corner 94*c*, respectively.

Figure 4:
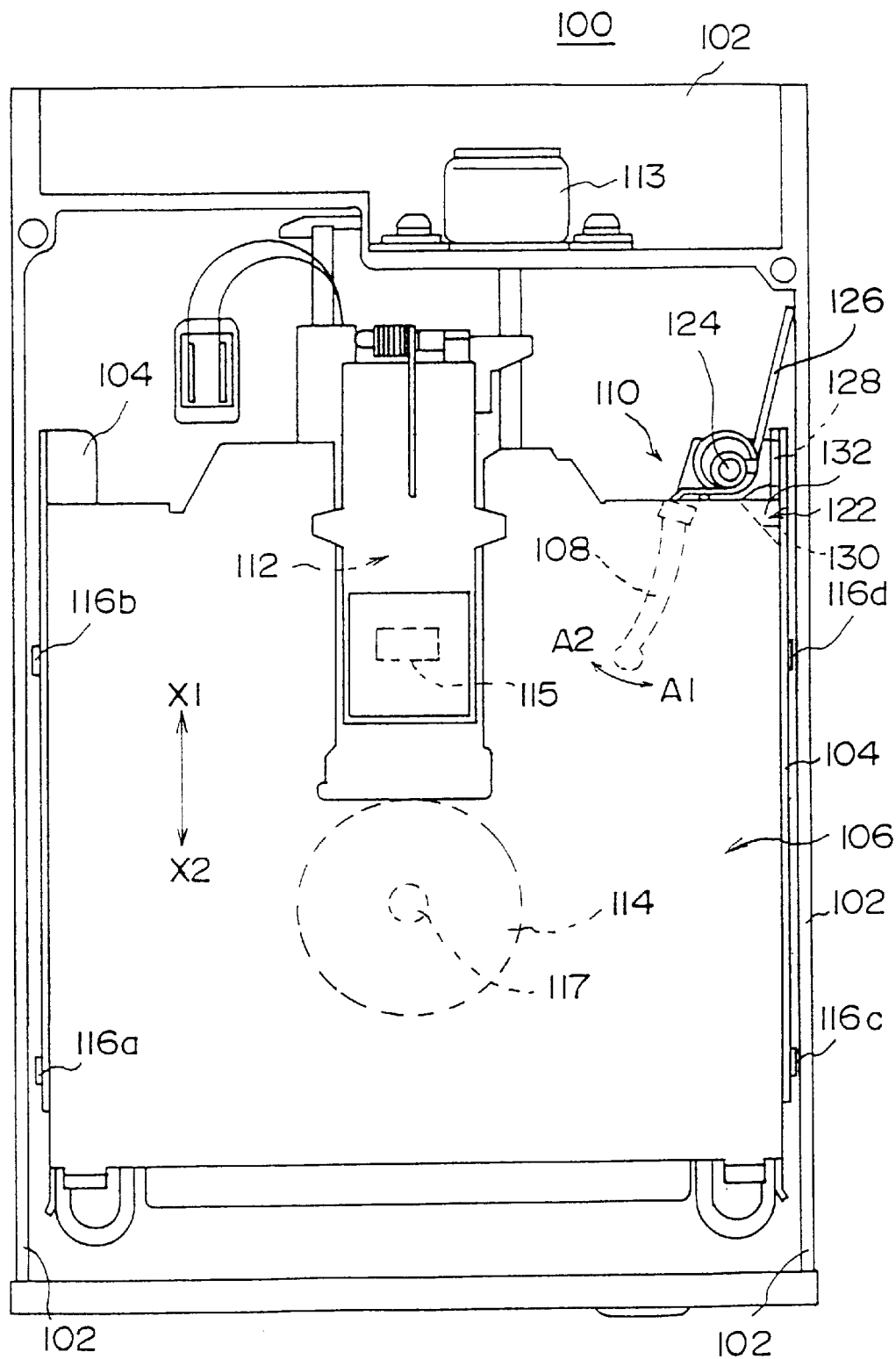
FIG. 4 is a top view of one embodiment of a disk drive of the present invention which is configured to access an increased-capacity disk.

FIG. 4 shows one embodiment of a disk drive of the present invention.

As described above, the disk cartridge 80 in the present embodiment is inserted and loaded into the disk drive 100 of the present invention, and the disk drive 100 accesses the increased-capacity disk 84 of the disk cartridge 80 to read information from or write information to the disk 84. Further, the disk drive 100 is configured to be capable of accessing the normal-capacity disk 14 of the disk cartridge 10 when inserted and loaded into the disk drive 100.

As shown in FIG. 4, the disk drive 100 includes a frame 22 in which various elements of the disk drive 100 are accommodated. The frame is made of an aluminum and formed through die casting of the aluminum. The disk drive 100 is provided with a disk loading device 110. The disk loading device 110 includes a slider 104 movably supported on the frame 102, a holder 106 provided within the slider 104, and a latch lever 108. A head carriage 112 which carries a read/write head 115 in a radial direction of the disk is provided on a top surface of the frame 102, and the head carriage 112 is moved by a stepping motor 113.

The read/write head 115 is provided on the head carriage 112. When the head carriage 112 is moved in one of the directions indicated by the arrows "X1" and "X2" in FIG. 4, the read/write head 115 is moved in a radial direction of the disk 84 or the disk 14 so as to read information from or write information to the disk 84 or the disk 14. The read/write head 115 of the disk drive 100 uses a head-contact pressure which is smaller than that of the read/write head of the conventional disk drive 20. Further, the read/write head 115 has corners which are rounded so as to make the read/write head 115 smoothly contact the disk 84 or the disk 14. Hence, when the disk 84 or the disk 14 is accessed by the disk drive 100, it is possible to prevent the recording surface (or a magnetic layer) of the disk from being significantly damaged by the read/write head 115.

In the present embodiment, the stepping motor 113 is provided to move the head carriage 112. Alternatively, a voice coil motor may be provided, instead of the stepping motor 113, to move the head carriage 112 at a higher level of accuracy of the movement.

Further, a turntable 114 on which the disk 84 or the disk 14 is mounted and rotated is provided in the frame 102. A disk rotating motor (not shown) which rotates the turntable 114 is provided on a back surface of the frame 102. The turntable 114 is provided on a rotating shaft 117 of the disk rotating motor.

The holder 106 is formed from a sheet metal by press forming. The holder 106 includes an internal space for accommodating the cartridge 10 or the cartridge 80 when inserted in the disk drive 100. Since the cartridge 10 and the cartridge 80 have a substantially identical configuration, they can be inserted into the holder 106. The holder 106 has side walls on which transversely extending pins 116a, 116b, 116c and 116d are provided. The slider 104 has side walls in which slanted grooves (not shown) are formed. The pins 116a through 116d of the holder 106 are connected to the slanted grooves of the slider 104 to guide and support the movement of the slider 104.

The latch lever 108 is rotatably supported on a shaft 124, and the shaft 124 is embedded on the frame 102. A helical torsion spring 126 is fixed to the shaft 124 and connected to the latch lever 108. The spring 126 exerts an actuating force on the latch lever 108 so as to rotate the lever 108 around the shaft 124 in a direction indicated by the arrow "A1" in FIG. 4.

As described above, when the cartridge 10 or the cartridge 80 in the correct position is inserted into the holder 106 of the disk drive 100, the shutter of the inserted cartridge is connected to the latch lever 108 so that the shutter is transversely moved by the latch lever 108 to open the opening of the case. Further, when the cartridge 10 or the cartridge 80 is moved to a given disk loading point within the holder 106, the connection of the latch lever 108 and the slider 104 is canceled. A spring (not shown) is connected to the slider 104 and exerts an actuating force on the slider 104 so as to push the slider 104 in an ejection direction indicated by the arrow "X2" in FIG. 4.

The latch lever 108 is provided with an internally formed hook 128, and the hook 128 is connected to the slider 104. When the cartridge 10 or the cartridge 80 is ejected out of the disk drive 100, the hook 128 is connected to the slider 104 so as to restrict the movement of the slider 104 in the ejection direction X2.

When the latch lever 108 is rotated in the direction A2 by the inserted cartridge, the hook 128 is separated from the slider 104 so that the slider 104 is moved in the ejection direction X2by the actuating force of the spring. The holder 106 in which the cartridge 10 or the cartridge 80 is held is lowered by the movement of the slider 104. This makes the cartridge 10 or the cartridge 80 be mounted on the turntable 114. The read/write head 115 on the head carriage 112 is brought into contact with the disk 14 or the disk 84 through the opening of the case 12 or the case 82.

In the disk drive 100 of FIG. 4, an erroneous insertion preventing device 122 is provided on the holder 106. The erroneous insertion preventing device 122 prevents erroneous insertion of the cartridge 10 or the cartridge 80 into the disk drive 100 when the related cartridge in a wrong position is inserted into the holder 106. The erroneous insertion preventing device 122 allows the insertion of the cartridge 10 or the cartridge 80 into the disk drive 100 only when the related cartridge in the correct position is inserted into the holder 106.

Figure 5:
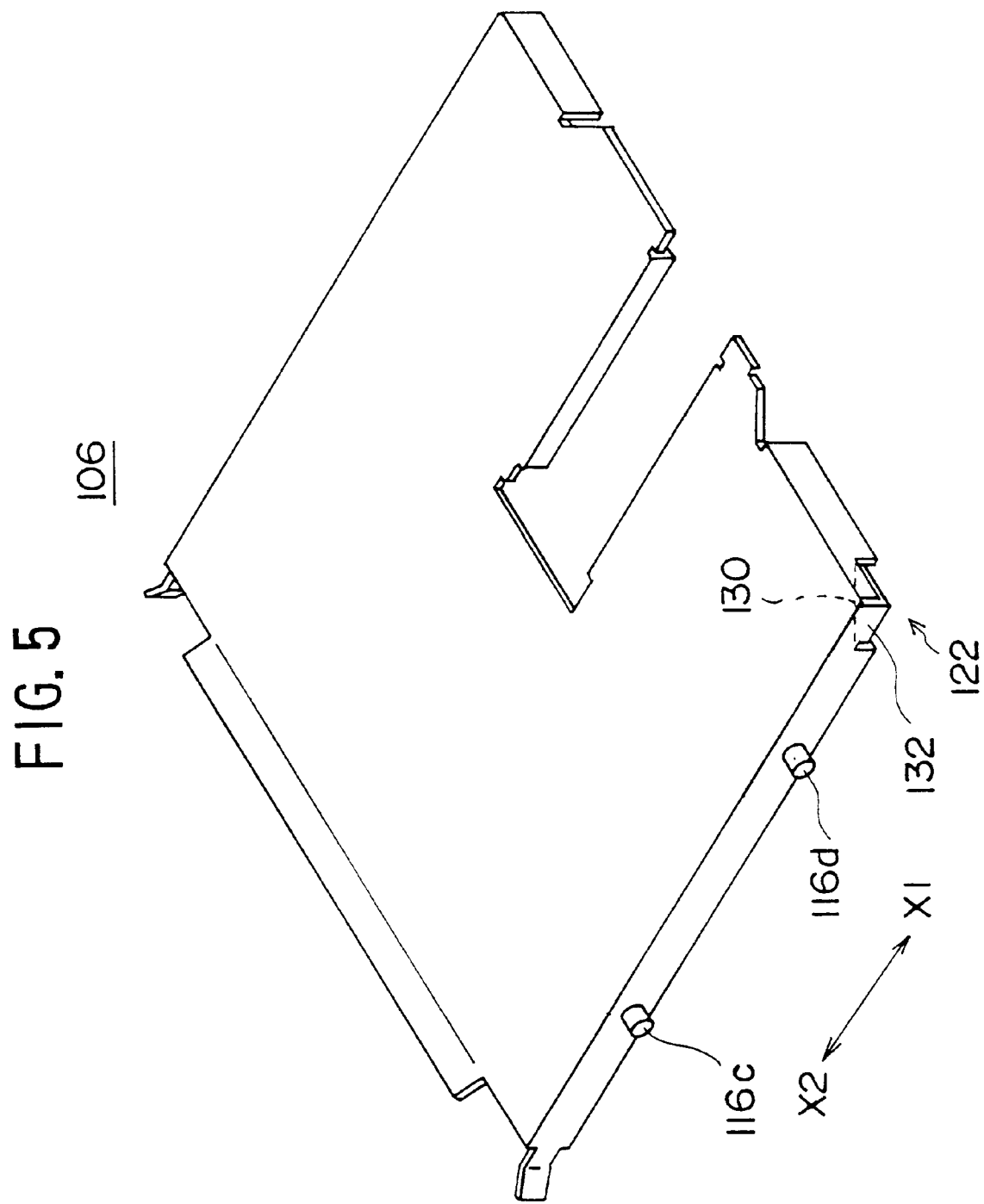
FIG. 5 is a perspective view of a holder in the disk drive of the present invention.
Figure 6:
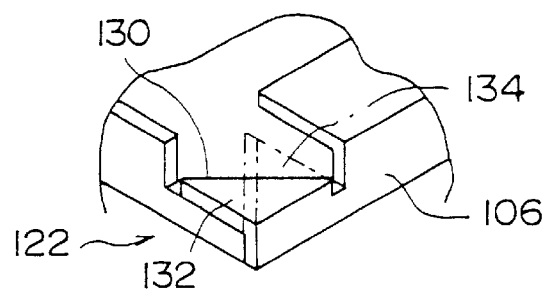
FIG. 6 is an enlarged view of an essential part of the holder.

FIG. 5 shows a holder in the disk drive of the present invention. FIG. 6 is an enlarged view of an essential part of the holder.

As shown in FIG. 5, the erroneous insertion preventing device 122 is provided at a given one of corners of the holder 106 on its rear edge confronting a disk cartridge when the cartridge is inserted into the holder 106 in the insertion direction X1. The erroneous insertion preventing device 122 includes a slanted wall 130 and a stepped-edge mounting surface 132. The slanted wall 130 is configured to match both the cut-out portion 90 (FIG. 1) of the cartridge 80 and the cut-off portion 38 (FIG. 11) of the cartridge 10. The stepped-edge mounting surface 132 is configured to match only the projecting portion 92 of the cartridge 80.

As described above, the holder 106 is formed from a sheet metal by press forming. The erroneous insertion preventing device 122 can easily be formed at the same time as the press forming for the holder 106. For example, a sheet metal of the holder 106 having a triangular extension 134, as indicated by one-dot chain lines in FIG. 6, is prepared. By bending the triangular extension 134 during the press forming for the holder 106, the erroneous insertion preventing device 122 can easily be formed on the holder 106.

Figures 7A, 7B:
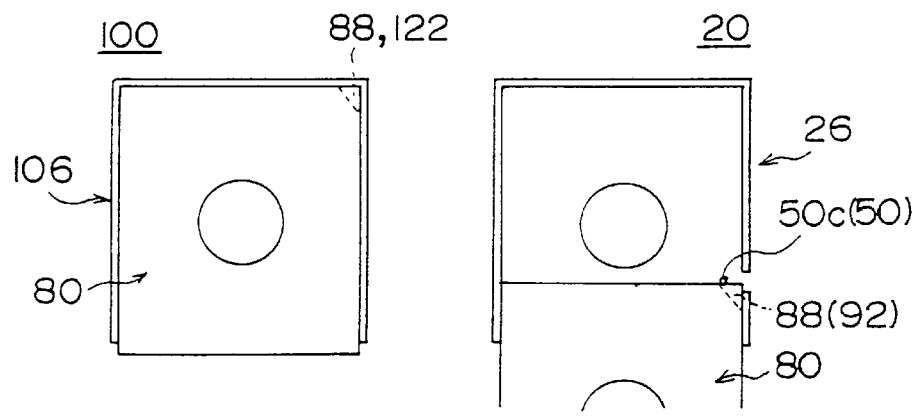
FIG. 7A and FIG. 7B are diagrams for explaining an erroneous insertion preventing function of the disk cartridge of the present invention.

FIG. 7A and FIG. 7B are diagrams for explaining an erroneous insertion preventing function of the disk cartridge of the present invention.

As shown in FIG. 7A, when the cartridge 80 (which is the first disk cartridge) in the correct position is inserted into the disk drive 100, the insertion of the cartridge 80 into the holder 106 is allowed by the erroneous insertion preventing device 122. More specifically, the projecting portion 92 of the cartridge 80 on the front edge at the corner where the part 88 is provided is mounted on the stepped-edge mounting surface 132 of the holder 106 on the rear edge at the corner where the device 122 is provided. The cut-out portion 90 of the cartridge 80 at the front-edge corner matches the slanted wall 130 of the holder 106 at the rear-edge corner.

As shown in FIG. 7B, when the cartridge 80 in the correct position is inserted into the conventional disk drive 20, the insertion of the cartridge 80 into the holder 26 is inhibited by the erroneous insertion preventing device 42. More specifically, the projecting portion 92 of the cartridge 80 on the front edge at the corner where the part 88 is provided confronts the leading edge of the extended arm portion 50c of the conventional disk drive 20. The extended arm portion 50c is not actuated by the cartridge 80 but pressed against the end of the groove 52. Hence, unlike the case of the disk cartridge 60 used with the conventional disk drive 20, the insertion of the cartridge 80 in the correct position into the conventional disk drive 20 is inhibited by the extended arm portion 50c of the erroneous insertion preventing device 42.

Accordingly, the disk cartridge 80 of the present invention is effective in preventing erroneous insertion of the disk cartridge 80 into the normal-capacity disk drive 20. This makes it possible to safely avoid damaging the recording surface of the increased-capacity disk 84 of the cartridge 80 by the read/write head of the normal-capacity disk drive 20.

Figures 8A, 8B:
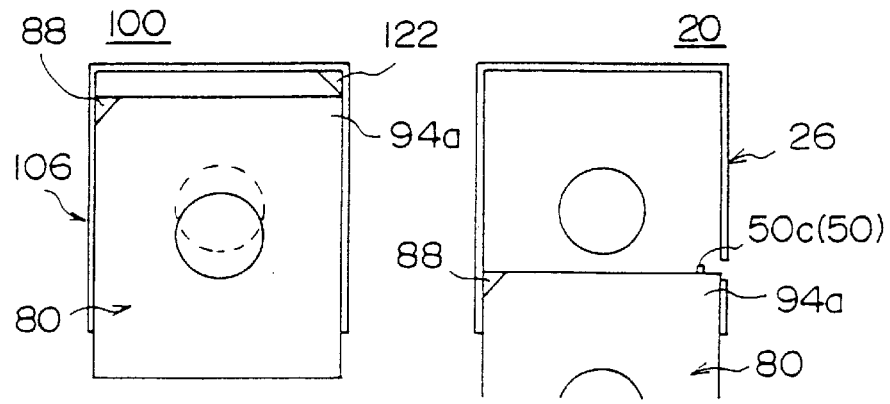
FIG. 8A and FIG. 8B are diagrams for explaining an erroneous insertion preventing function of the disk cartridge of the present invention.

FIG. 8A and FIG. 8B are diagrams for explaining an erroneous insertion preventing function of the disk cartridge of the present invention.

As shown in FIG. 8A, when the cartridge 80 in a wrong correct position is inserted into the disk drive 100, the insertion of the cartridge 80 into the holder 106 is inhibited by the erroneous insertion preventing device 122. More specifically, the right-angled corner 94a of the cartridge 80 on the front edge where the part 88 is not provided hits the slanted wall 130 of the holder 106 on the rear edge at the corner where the device 122 is provided. A further insertion of the cartridge 80 into the holder 106 is stopped by the slanted wall 130 of the holder 106.

As shown in FIG. 8B, when the cartridge 80 in a wrong position is inserted into the conventional disk drive 20, the insertion of the cartridge 80 into the holder 26 is inhibited by the erroneous insertion preventing device 42. More specifically, the right-angled corner 94a of the cartridge 80 on the front edge at the corner where the part 88 is not provided hits the leading edge of the extended arm portion 50c of the conventional disk drive 20. The extended arm portion 50c is not actuated by the cartridge 80 but pressed against the end of the groove 52. Hence, the insertion of the cartridge 80 in the wrong position into the conventional disk drive 20 is inhibited by the extended arm portion 50c of the erroneous insertion preventing device 42.

Accordingly, the disk cartridge 80 of the present invention is effective in preventing erroneous insertion of the disk cartridge 80 into the increased-capacity disk drive 100 or the normal-capacity disk drive 20. This makes it possible to safely avoid damaging the recording surface of the increased-capacity disk 84 of the cartridge 80 by the read/write head of the normal-capacity disk drive 20.

Figure 9A:
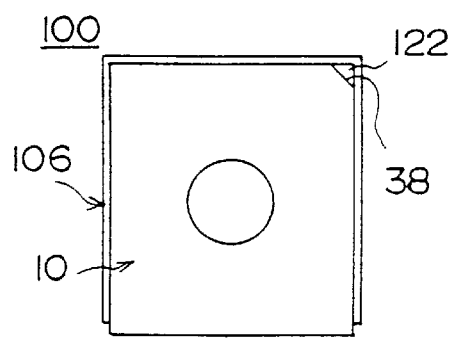
FIG. 9A and FIG. 9B are diagrams for explaining an erroneous insertion preventing function of the disk drive of the present invention.
Figure 9B:
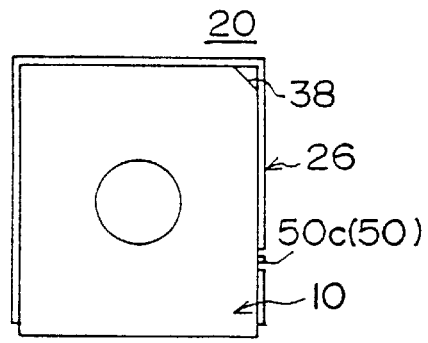

FIG. 9A and FIG. 9B are diagrams for explaining an erroneous insertion preventing function of the disk drive of the present invention.

As shown in FIG. 9A, when the cartridge 10 (which is the second disk cartridge) in the correct position is inserted into the disk drive 100 (which is the first disk drive), the insertion of the cartridge 10 into the holder 106 is allowed by the erroneous insertion preventing device 122. More specifically, the cut-off portion 38 of the cartridge 10 at the front-edge corner matches the slanted wall 130 of the holder 106 on the rear edge at the corner where the device 122 is provided. The cartridge 10 in the correct position can be inserted into the disk drive 100 of the present invention without interference, and the read/write head 115 of the disk drive 100 reads information from or writes information to the normal-capacity disk 14 of the cartridge 10.

Figure 14A:
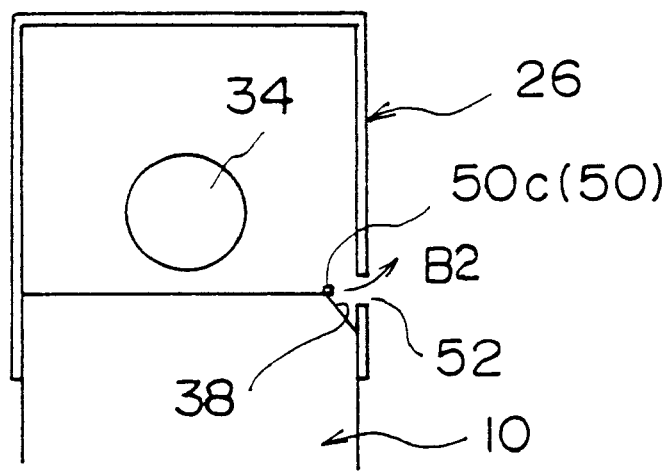
FIG. 14A through FIG. 14C are diagrams for explaining an erroneous insertion preventing function of the conventional disk drive shown in FIG. 13.
Figure 14B:
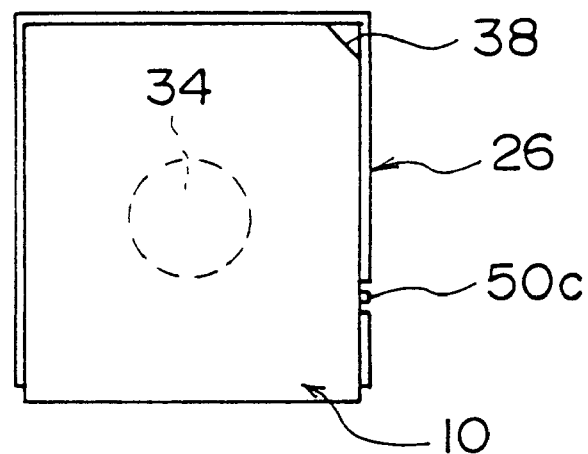
Figure 14C:
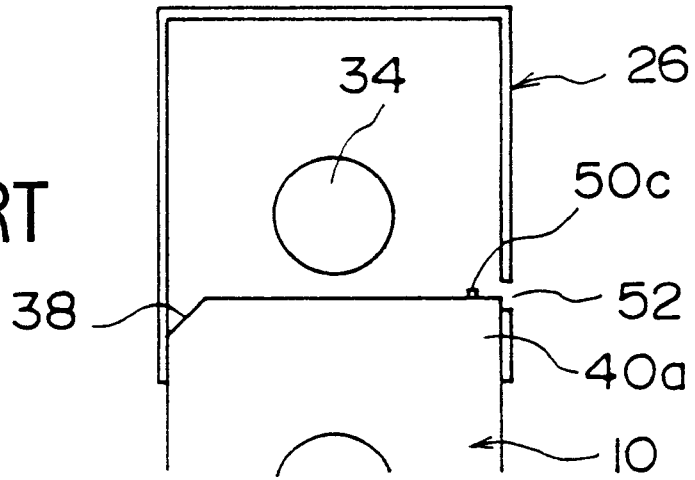

As shown in FIG. 9B, when the cartridge 10 (which is the second disk cartridge) in the correct position is inserted into the conventional disk drive 20 (which is the second disk drive), the insertion of the cartridge 10 into the holder 26 is allowed by the erroneous insertion preventing device 42 (see FIG. 14B). More specifically, the cut-off portion 38 of the cartridge 10 confronts the leading edge of the extended arm portion 50c of the conventional disk drive 20. The extended arm portion 50c is transversely actuated by the cut-off portion 38 of the inserted cartridge 10, and the insertion of the cartridge 10 into the holder 26 is allowed. Hence, the insertion of the cartridge 10 in the correct position into the conventional disk drive 20 is allowed by the extended arm portion 50c of the erroneous insertion preventing device 42.

Figure 10A:
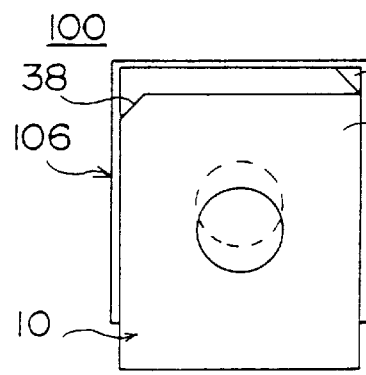
FIG. 10A and FIG. 10B are diagrams for explaining an erroneous insertion preventing function of the disk drive of the present invention.
Figure 10B:
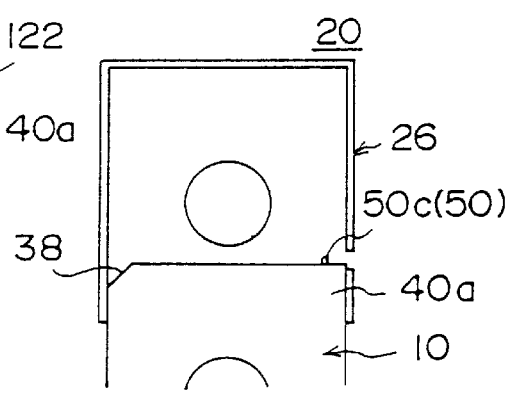

FIG. 10A and FIG. 10B are diagrams for explaining an erroneous insertion preventing function of the disk drive of the present invention.

As shown in FIG. 10A, when the cartridge 10 (which is the second disk cartridge) in a wrong correct position is inserted into the disk drive 100 (which is the first disk drive), the insertion of the cartridge 10 into the holder 106 is inhibited by the erroneous insertion preventing device 122.

More specifically, the right-angled corner 40a of the cartridge 10 on the front edge where the cut-off portion 38 is not provided hits the slanted wall 130 of the holder 106 on the rear edge at the corner where the device 122 is provided. A further insertion of the cartridge 10 into the holder 106 is stopped by the slanted wall 130 of the holder 106.

As shown in FIG. 10B, when the cartridge 10 (which is the second disk cartridge) in a wrong position is inserted into the conventional disk drive 20 (which is the second disk drive), the insertion of the cartridge 10 into the holder 26 is inhibited by the erroneous insertion preventing device 42. More specifically, the right-angled corner 40a of the cartridge 10 on the front edge where the cut-off portion 38 is not provided hits the leading edge of the extended arm portion 50c of the conventional disk drive 20. The extended arm portion 50c is not actuated by the cartridge 10 but pressed against the end of the groove 52. Hence, the insertion of the cartridge 10 in the wrong position into the conventional disk drive 20 is inhibited by the extended arm portion 50c of the erroneous insertion preventing device 42.

Accordingly, the disk drive 100 of the present invention is capable of accessing each of the normal-capacity disk 14 and the increased-capacity disk 84 when the related disk cartridge in the correct position is inserted into the disk drive 100. The disk drive 100 which has the erroneous insertion preventing device 122 is effective in preventing the erroneous insertion of either the first disk cartridge 80 or the second disk cartridge 10 in a wrong position into the disk drive 100. This makes it possible to safely avoid damaging the recording surface of either the increased-capacity disk 84 or the normal-capacity disk 14 by the read/write head 115 of the disk drive 100.

In the above-described embodiment, the present invention is applied to a magnetic disk drive. However, the present invention is not limited to the above-described embodiment. For example, the present invention may be applied to an optical disk drive or a magneto-optical disk drive.

In the above-described embodiment, the present invention is applied to a disk drive configured such that a slider is moved below a holder. However, the present invention is not limited to the above-described embodiment. For example, the present invention may be applied to a disk drive configured such that a slider is moved above a holder.

Further, the present invention is not limited to the above-described embodiments, and variations and modifications may be made without departing from the scope of the present invention.

The present invention is based on Japanese priority application No. 9-257099, filed on Sep. 22, 1997, the entire contents of which are hereby incorporated by reference.

What is claimed is:

1. A disk drive in which one of a first disk cartridge having an increased-capacity disk contained in a first case and a second disk cartridge having an existing disk contained in a second case is inserted so as to access the disk of the inserted cartridge by a read/write head, the first case having a cut-out portion and a projecting portion provided in an overlaid manner at one of corners of a front edge of the first case confronting the disk drive when the first disk cartridge is inserted, the second case having a cut-off portion provided at one of corners of a front edge of the second case confronting the disk drive when the second disk cartridge is inserted, said disk drive comprising:

a holder for holding one of the first disk cartridge and the second disk cartridge;

a slanted wall provided at one of corners of a rear edge of the holder confronting one of the first disk cartridge and the second disk cartridge when inserted into the holder, said slanted wall configured to match both the cut-out portion of the first disk cartridge and the cut-off portion of the second disk cartridge; and a mounting surface provided adjacent to the slanted wall at said one of the corners of the rear edge of the holder, said mounting surface configured to match only the projecting portion of the first disk cartridge.

2. The disk drive according to claim 1, wherein the slanted wall and the mounting surface allow in a cooperative manner the insertion of one of the first disk cartridge and the second disk cartridge into the holder when said one of the first disk cartridge and the second disk cartridge in a predetermined position is inserted into the disk drive.

3. The disk drive according to claim 1, wherein the slanted wall inhibits the insertion of one of the first disk cartridge and the second disk cartridge into the holder when said one of the first disk cartridge and the second disk cartridge in a wrong position is inserted into the disk drive.

4. The disk drive according to claim 1, wherein the slanted wall extends at an angle with respect to an insertion direction, the angle of the slanted wall being identical with both an angle of a slanted surface of the first disk cartridge and an angle of a slanted surface of the second disk cartridge.

5. The disk drive according to claim 1, wherein the slanted wall and the mounting surface are simultaneously formed from a triangular extension of a sheet metal of the holder through press forming.

* * * * *